(12) United States Patent
Reid

(10) Patent No.: US 10,713,405 B2
(45) Date of Patent: *Jul. 14, 2020

(54) PARAMETER GENERATION FOR SEMICONDUCTOR DEVICE TRAPPED-CHARGE MODELING

(71) Applicant: SYNOPSYS, INC., Mountain View, CA (US)

(72) Inventor: David Thomas Reid, Glasgow (GB)

(73) Assignee: SYNOPSYS, INC., Mountain View, CA (US)

( * ) Notice: Subject to any disclaimer, the term of this patent is extended or adjusted under 35 U.S.C. 154(b) by 459 days.

This patent is subject to a terminal disclaimer.

(21) Appl. No.: 15/149,977

(22) Filed: May 9, 2016

(65) Prior Publication Data
US 2016/0342719 A1 Nov. 24, 2016

Related U.S. Application Data

(60) Provisional application No. 62/163,924, filed on May 19, 2015.

(51) Int. Cl.
G06F 30/367 (2020.01)
(52) U.S. Cl.
CPC .................. G06F 30/367 (2020.01)
(58) Field of Classification Search
CPC ............. G06F 17/5009; G06F 11/3409; G06F 17/5036; G06F 30/367
See application file for complete search history.

(56) References Cited

U.S. PATENT DOCUMENTS

2008/0282217 A1* 11/2008 Takao ............... H01L 21/82341
716/50
2010/0269079 A1* 10/2010 Banerjee ............. G06F 17/5009
716/106

OTHER PUBLICATIONS

Andre Lange, Christoph Sohrmann, Roland Jancke, Joachim Haase, Binjie Cheng, Urban Kovac, Asen Asenov; A General Approach for Multivariate Statistical MOSFET Compact Modeling Preserving Correlations; 2011; 4 pages (Year: 2011).*

(Continued)

Primary Examiner — Doon Y Chow
Assistant Examiner — Kimberly L Jordan
(74) Attorney, Agent, or Firm — Haynes Beffel & Wolfeld LLP

(57) ABSTRACT

A method for generating semiconductor device model parameters includes receiving semiconductor device performance data of statistical instances of semiconductor devices, for a plurality of areal trapped charge densities Model parameters are extracted to produce individual model instances, each corresponding to the respective statistical instances for the areal trapped charge densities. Statistics of the extracted model parameters are modeled by processing the individual model instances to determine, for each areal trapped charge density, moments describing non-normal marginal distributions of the extracted model parameters and correlations between the extracted model parameters. Semiconductor device model parameters are generated for use in simulating a circuit using the determined moments and the determined correlations, for a selected areal trapped charge density.

17 Claims, 8 Drawing Sheets

(56) References Cited

OTHER PUBLICATIONS

Muhammad Faiz Bukhori, Scott Roy, and Asen Asenov; Simulation of Statistical Aspects of Charge Trapping and Related Degradation in Bulk MOSFETs in the Presence of Random Discrete Dopants; 2010; 9 pages (Year: 2010).*
Cheng, et al. "Statistical-Variability Compact-Modeling Strategies for BSIM4 and PSP." IEEE Design & Test of Computers 27.2, Mar./Apr. 2010, pp. 26-35.
U.S. Appl. No. 15/149,994—Office Action dated Sep. 10, 2018, 20 pages.
Lange et al., "A General Approach for Multivariate Statistical MOSFET Compact Modeling Preserving Correlations," IEEE (2011), pp. 163-166.
U.S. Appl. No. 15/150,009—Office Action dated Sep. 21, 2018, 20 pages.
Asenov et al., "Predictive Simulation of Future CMOS Technologies and Their Impact on Circuits," IEEE, Oct. 1, 2014, 4 pages.
Freimer et al., "A Study of the Generalized Tukey Lambda Family," Communications in Statistics—Theory and Methods vol. 17, Iss. 10, 1988, pp. 3547-3567.

* cited by examiner

PARAMETER GENERATION FOR SEMICONDUCTOR DEVICE TRAPPED-CHARGE MODELING

CROSS REFERENCE TO RELATED APPLICATIONS

The present invention claims priority to U.S. Provisional Application No. 62/163,924, entitled "Parameter Generation for Semiconductor Device Trapped-Charge Modeling" and filed on May 19, 2015, the entirety of which is being incorporated by reference herein. The present application may also be related to U.S. patent application Ser. No. 15/149,994, entitled "Parameter Generation for Modeling of Process-Induced Semiconductor Device Variation" and filed on May 9, 2016, which, in turn, claims priority to U.S. Provisional Application No. 62/186,120, entitled "Parameter Generation for Modeling of Process-Induced Semiconductor Device Variation" and filed on Jun. 29, 2015, the entirety of both of which is being incorporated by reference herein. The present application may also be related to U.S. patent application Ser. No. 15/150,009, entitled "Semiconductor Device Simulation" and filed on May 9, 2016, which, in turn, claims priority to U.S. Provisional Application No. 62/239,235, entitled "Semiconductor Device Simulation" and filed on Oct. 8, 2015, the entirety of both of which is being incorporated by reference herein.

TECHNICAL FIELD

The present invention is generally in the field of semiconductors. More particularly, the invention is in the field of semiconductor device modeling and in particular methods and systems of generating semiconductor device model parameters for modeling trapped charge. The invention also relates to associated non-transitory computer-readable media and computer-readable media containing program code. The invention also relates to an associated method of manufacturing integrated circuits and the integrated circuits thus manufactured.

BACKGROUND ART

Semiconductor device models, such as transistor models, are vital in achieving reliable performance from circuit designs using semiconductor devices. Moreover, semiconductor device models can significantly increase the efficiency of the circuit design process.

Compact transistor models such as BSIM4 (Berkeley Short-channel IGFET Model 4) are simplified physical models typically employed in circuit simulators, for example SPICE (Simulation Program with Integrated Circuit Emphasis) to model the behavior of semiconductor devices such as CMOS (Complementary Metal-Oxide-Semiconductor) field effect transistors in integrated circuits. The set of parameters that specify the behavior of a particular semiconductor device are stored in a data structure called a model card, which is used as an input to a SPICE simulation process.

In contemporary semiconductor technologies, notionally identical devices may in actuality have radical variations in performance due to intrinsic parameter fluctuations that are caused by physical phenomena such as random discrete dopants (RDD), line edge roughness (LER) and metal gate granularity (MGG).

One method to incorporate such variations into compact models is to take a "uniform" model that is fitted to the "average" performance of the device and re-extract a subset of the model parameters to adjust the performance to match that of individual instances. This yields a statistical distribution for each model parameter that is re-extracted. Such distributions may also be correlated with each other to a certain degree.

Monte Carlo circuit simulations can then employ such models to estimate the statistical distributions of key performance metrics of CMOS standard cells. The traditional approach to this entails substituting one of the above extracted model cards in place of each transistor in the circuit. This necessarily imposes limits on the scenarios that can be analyzed in that the models are only valid for e.g. a specific process geometry. Additional limitations are imposed by the fact that one model card corresponds to one transistor instance, for which target data must be obtained either from measurement or from TCAD (Technology Computer Aided Design) simulation. As the problem space scales up, this becomes a significant consideration.

In addition to the static intrinsic variability sources such as random discrete dopant RDD and line edge roughness LER, there are time-dependent effects that are of concern in contemporary deep submicron technologies. This includes negative-bias temperature instability (NBTI) and positive-bias temperature instability (PBTI), which are degradation mechanisms by which performance is reduced when the transistor is subject to electrical and thermal stress. NBTI and PBTI have both recoverable and permanent effects on performance. The recoverable portion of the performance reduction is removed once the external stress is removed, however the permanent component remains, and is of great concern when considering product lifetime and mean time to failure. NBTI and PBTI are of particular concern in high-k metal gate technologies.

Previous approaches to modeling reliability as a statistical phenomenon have tended to treat it as distinct from the static variations arising from RDD, LER and metal gate granularity MGG. However it is known that bias temperature instability (BTI) can have strong interactions with RDD, producing unusually large performance shifts. The likelihood of such shifts increases as the cumulative stress increases, i.e. the circuit ages. It is therefore desirable for this to be accurately included in compact models used for evaluating yield—particularly for circuits in the late stages of degradation.

A known approach for including the effects of BTI in compact models is to employ the same strategy as for static variability. That is, to re-extract a subset of the model parameters to capture the changes in performance. This approach can also be applied to capture the permanent component of circuit ageing. This leads to model parameter distributions that effectively evolve over time in a certain fashion.

However, it is a problem that known approaches do not accurately model time dependent degradation and reliability of semiconductor devices.

SUMMARY

A method for semiconductor device modeling, substantially as shown in and/or described in connection with at least one of the figures, and as set forth more completely in the claims.

According to a first aspect of the present invention, there is provided a method for execution in at least one processor of at least one computer, the method for generating semiconductor device model parameters, the method comprising the steps of:

(a) receiving semiconductor device performance data of a plurality of statistical instances of semiconductor devices, for a plurality of areal trapped charge densities, wherein at least some of the semiconductor device performance data is obtained, at least in part, from a data set acquired by measurement;

(b) extracting model parameters from the semiconductor device performance data to produce a plurality of individual model instances each corresponding to the respective statistical instances for the plurality of areal trapped charge densities;

(c) modeling statistics of the extracted model parameters by processing the individual model instances to determine, for each areal trapped charge density:

moments describing non-normal marginal distributions of the extracted model parameters and correlations between the extracted model parameters; and (d) generating semiconductor device model parameters using the determined moments and the determined correlations, for a selected areal trapped charge density.

Preferably, differences between the statistical instances relate to different modelled configurations of random variability sources, including trapping, which affect semiconductor device performance.

Preferably, the random variability sources further comprise at least one of random discrete dopants (RDD), line edge roughness (LER) and gate granularity.

Preferably, the step (a) of receiving semiconductor device performance data further comprises obtaining uniform semiconductor device performance data of a uniform semiconductor device that is a basis around which variations occur, and the step (b) of extracting model parameters comprises extracting from the uniform semiconductor device performance data a set of uniform model parameters and using the uniform model parameters to re-extract from the semiconductor device performance data a subset of the uniform model parameters for each of the statistical instances, the subset model parameters being selected to capture intrinsic statistical variability of semiconductor device performance that arises from intrinsic parameter fluctuation of time-dependent degradation due to charge trapping in a gate dielectric of the semiconductor device.

Preferably, the step (c) of modeling statistics comprises using interpolation to calculate moments and correlations at intermediate values of areal trapped charge density.

Preferably, the step (c) of modeling statistics further comprises calculating Generalized Lambda Distribution (GLD) parameters to fit the moments by fitting each determined marginal distribution to a Generalized Lambda Distribution (GLD) using the method of moments.

Preferably, the step (d) of generating model parameters comprises generating multivariate Gaussian variates and applying a Probability Integral Transform to obtain a random sample of variates as the semiconductor device model parameters.

According to a second aspect of the present invention, there is provided a non-transitory computer-readable medium containing program code, the program code adapted to configure the at least one processor of the at least one computer to execute the method of the first aspect.

According to a third aspect of the present invention, there is provided a computer-readable medium containing program code, the program code adapted to configure the at least one processor of the at least one computer to execute the method of the first aspect, the computer-readable medium being selected from the group consisting of a compact disk (CD), a digital video disk (DVD), a flash memory storage device, a hard disk, a random access memory (RAM), and a read only memory (ROM).

According to a fourth aspect of the present invention, there is provided a system for generating semiconductor device model parameters, the system obtaining a set of measured data from a substrate under test, the substrate under test including a physical semiconductor device, the set of measured data being utilized by at least one processor of at least one computer of the system to implement a method for generating semiconductor device model parameters, the computer configured to perform the steps of:

(a) receiving semiconductor device performance data of a plurality of statistical instances of semiconductor devices, for a plurality of areal trapped charge densities;

(b) extracting model parameters from the semiconductor device performance data to produce a plurality of individual model instances each corresponding to the respective statistical instances for the plurality of areal trapped charge densities;

(c) modeling by computer statistics of the extracted model parameters by processing the individual model instances to determine, for each areal trapped charge density:

moments describing non-normal marginal distributions of the extracted model parameters and correlations between the extracted model parameters; and (d) generating semiconductor device model parameters using the determined moments and the determined correlations, for a selected areal trapped charge density.

According to a fifth aspect of the present invention, there is provided a method of manufacturing integrated circuits, the method comprising the steps of:

(a) receiving semiconductor device performance data of a plurality of statistical instances of semiconductor devices, for a plurality of areal trapped charge densities, wherein at least some of the semiconductor device performance data is obtained, at least in part, from a data set acquired by measurement;

(b) extracting model parameters from the semiconductor device performance data to produce a plurality of individual model instances each corresponding to the respective statistical instances for the plurality of areal trapped charge densities;

(c) modeling statistics of the extracted model parameters by processing the individual model instances to determine, for each areal trapped charge density:

moments describing non-normal marginal distributions of the extracted model parameters and correlations between the extracted model parameters;

(d) generating semiconductor device model parameters using the determined moments and the determined correlations, for a selected areal trapped charge density;

(e) using the generated semiconductor device model parameters to generate a circuit layout; and (f) using the circuit layout to pattern a semiconductor substrate to produce an integrated circuit.

According to a sixth aspect of the present invention, there is provided an integrated circuit manufactured using the method of the fifth aspect.

BRIEF DESCRIPTION OF THE DRAWINGS

Embodiments of the present invention will now be described, by way of example only, with reference to the drawings, in which.

DETAILED DESCRIPTION OF EMBODIMENTS

The present invention is directed to a method of generating semiconductor device model parameters. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention.

The drawings in the present application and their accompanying detailed description are directed to merely exemplary embodiments of the invention. To maintain brevity, other embodiments of the present invention are not specifically described in the present application and are not specifically illustrated by the present drawings.

Figure 1:
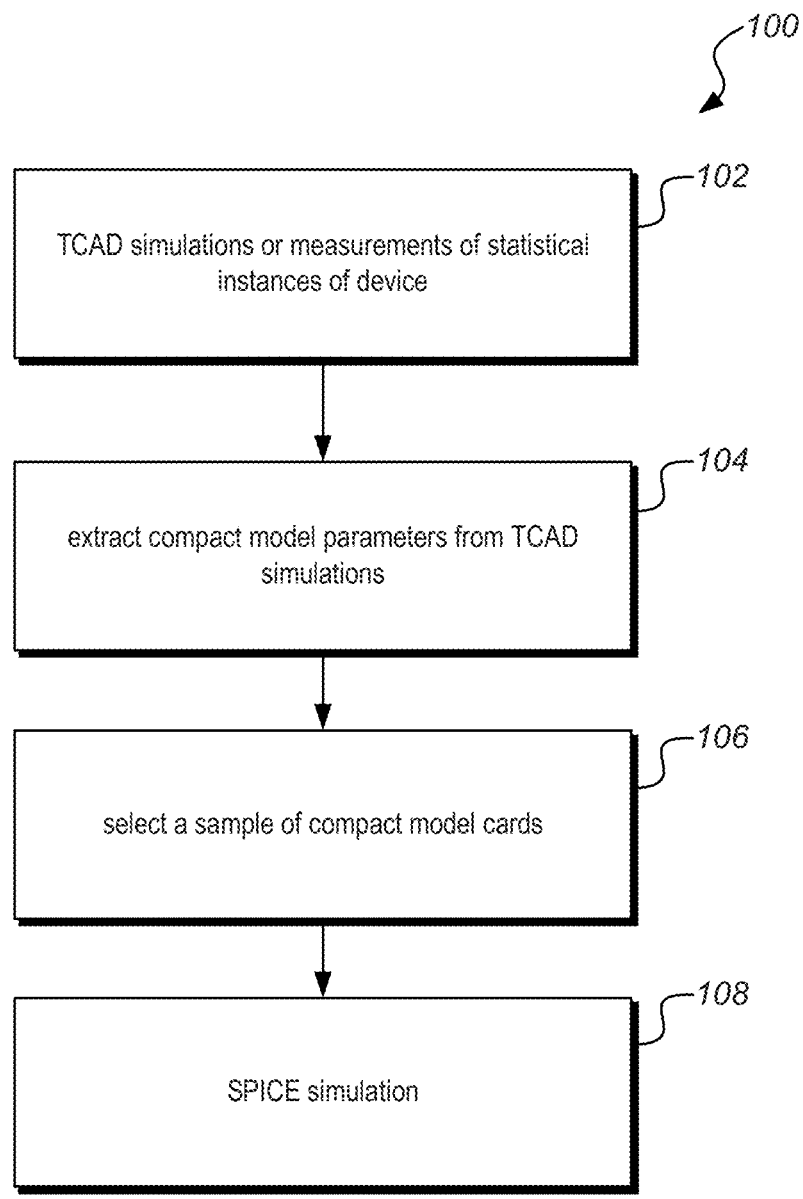
FIG. 1 shows a flowchart illustrating typical steps taken to implement a conventional method.

With reference to FIG. 1, a flowchart 100 illustrates typical steps taken to implement a conventional method. At step 102, TCAD simulations of, for example, a thousand statistical instances of a semiconductor device are performed. The differences between the statistical instances relate to different modelled configurations of random variability sources which affect semiconductor device performance, such as RDD, LER and MGG. At step 104, compact model parameters are extracted from the results of the TCAD simulations and stored as a thousand model cards. At step 106, a sample of six of the compact model cards are selected and used for SPICE simulation at step 108.

Figure 2:
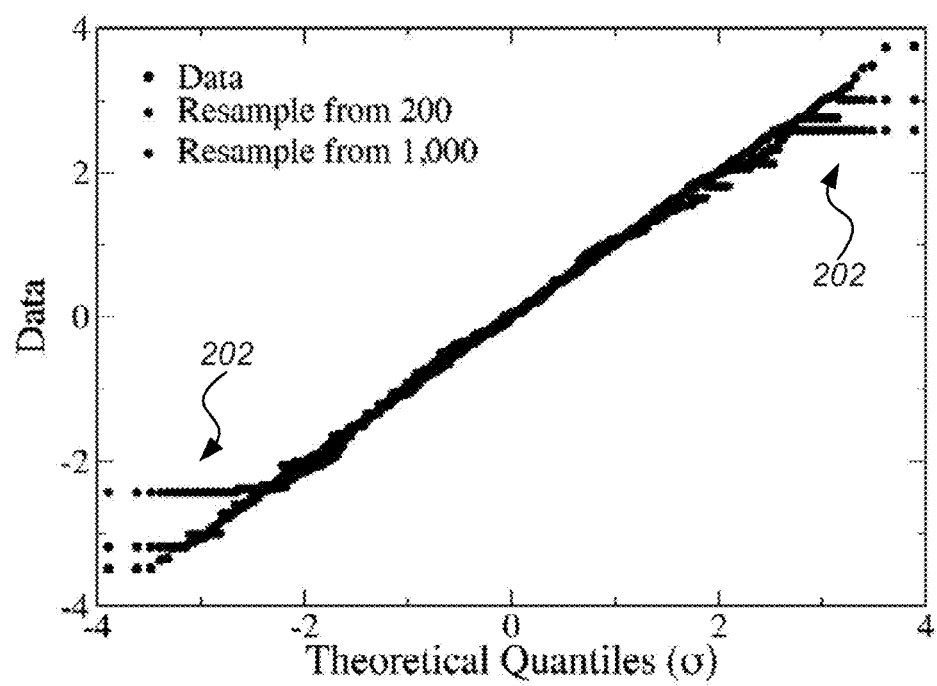
FIG. 2 shows a quantile-quantile plot illustrating a problem arising from the conventional method.

FIG. 2, which shows a quantile-quantile plot, illustrates the problem of using TCAD extracted models directly according to the conventional method of FIG. 1. This is example data, generated from a standard normal distribution and then resampled to specifically illustrate the subsampling problem. In this example 6 model cards are sampled from $n_s$=200 and $n_s$=1000 simulations, in order to represent a 6T (6-transistor) cell. Repeated sampling of limited numbers of models leads to statistical artefacts in the tails 202. This can be avoided by generating models in a way that duplicates the statistics of the model parameters, as described below.

In the present disclosure, we define:
1. A set of compact model parameters S, of size $n_p$.
2. A statistical sample size $n_s$.
3. A set of areal trapped charge densities Q, of size $n_q$.

Figure 3:
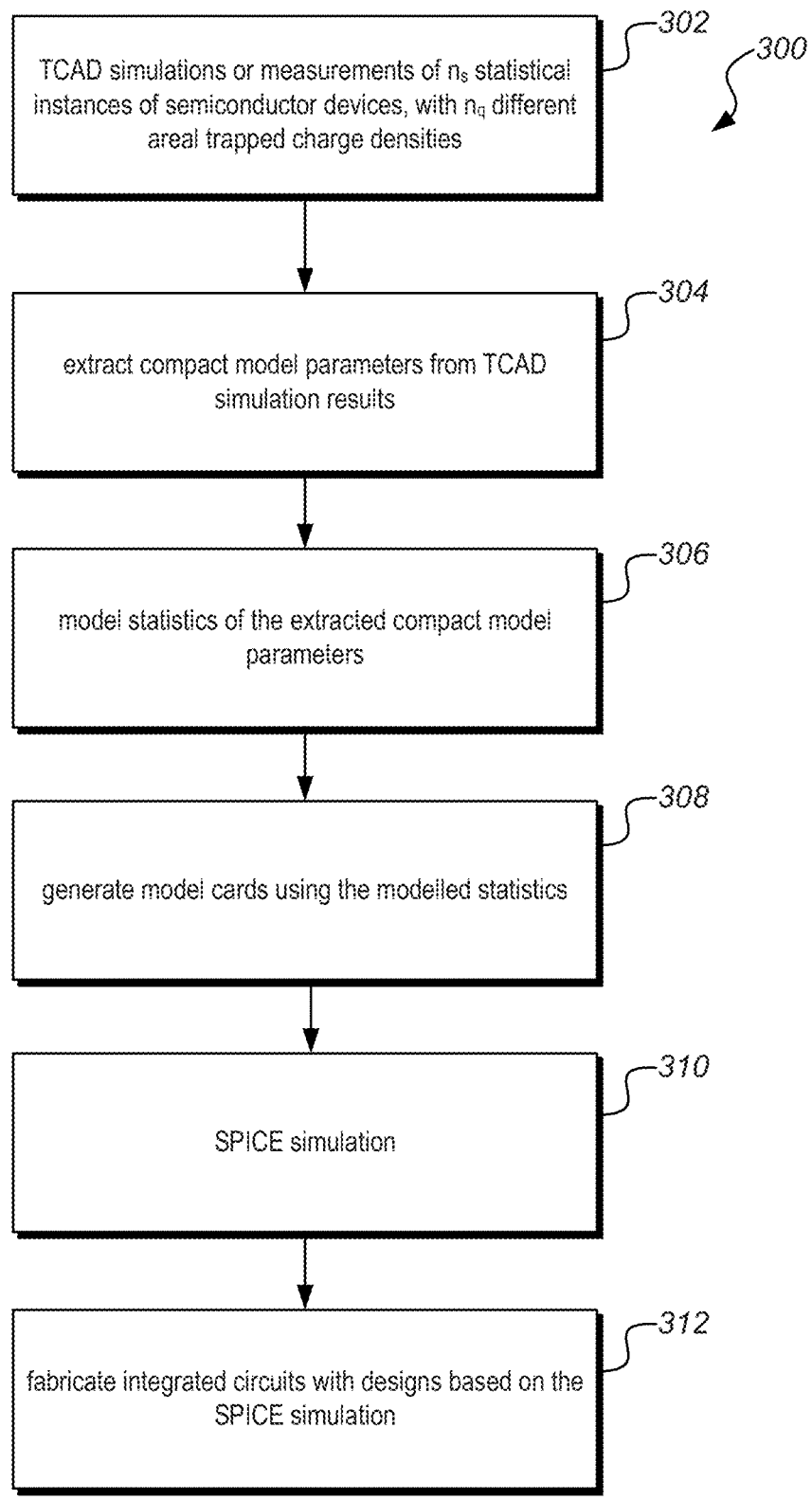
FIG. 3 shows a flowchart illustrating the steps taken to implement an embodiment of the present invention.

FIG. 3 shows a flowchart illustrating the steps taken to implement an embodiment of the present invention for generating semiconductor device model parameters and subsequently fabricating integrated circuits.

Figure 4:
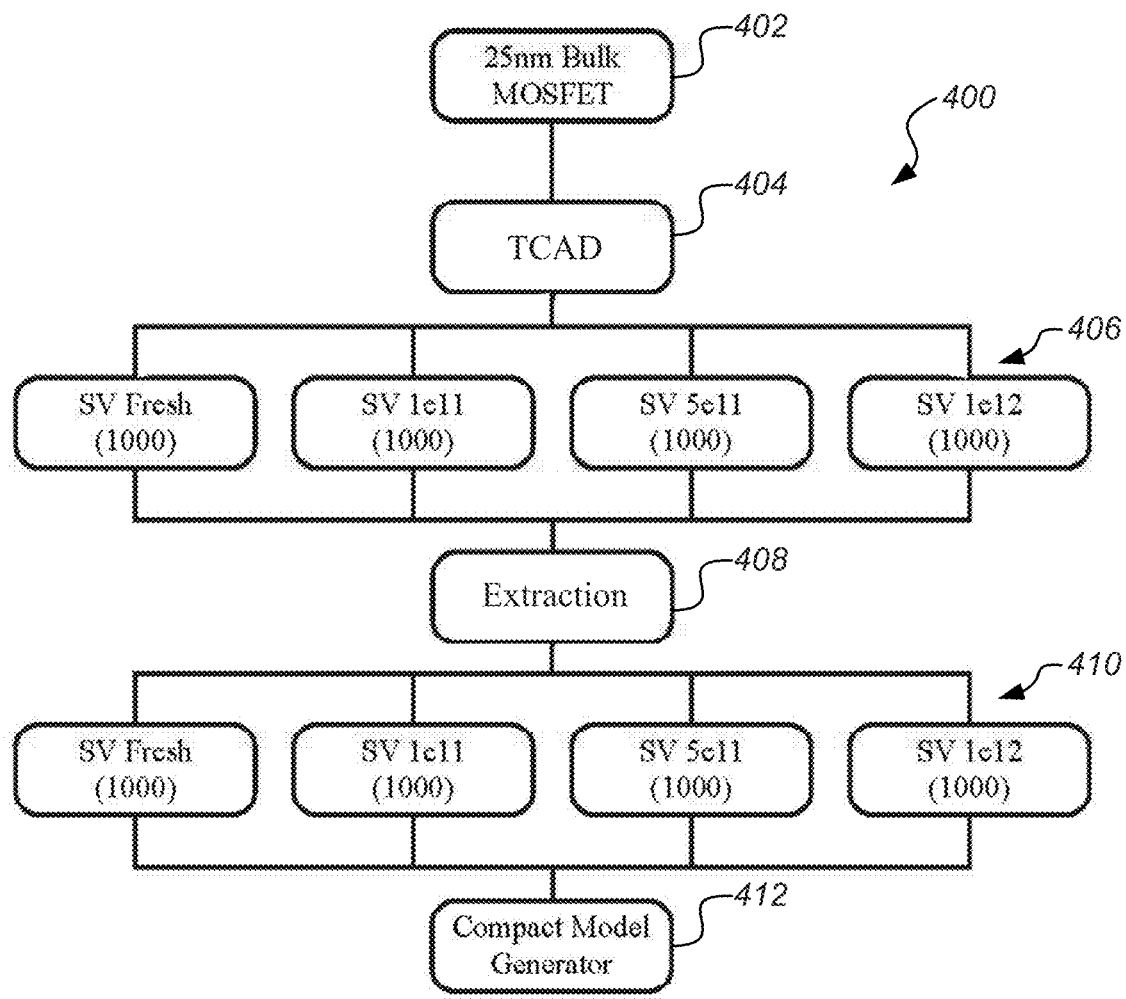
FIG. 4 shows the flow of data from physical TCAD simulations via compact models through to a compact model generator.

At step 302, TCAD simulations of a plurality ($n_s$=1000) of statistical instances of semiconductor devices are performed for a plurality ($n_q$=3) of areal trapped charge densities (Q=$1\times10^{11}$, $5\times10^{11}$ and $1\times10^{12}$), to produce simulation results (406 in FIG. 4). The TCAD simulation model is calibrated by acquiring a data set by measurements on physical semiconductor devices and fitting the TCAD parameters to the measured data set. When obtaining the semiconductor device performance data by simulation, the statistical instances may include a uniform semiconductor device (labelled "Fresh" in FIG. 4) that is the basis around which variations occur. The differences between the statistical instances relate to different modelled configurations of random variability sources, including trapping, which affect semiconductor device performance. The random variability sources may also comprise at least one of RDD, LER and gate granularity.

Another way of obtaining suitable semiconductor device performance data is to measure statistical instances of actual physical semiconductor devices. The differences between the statistical instances then relate to different actual physical configurations of random variability sources, including trapping, which affect semiconductor device performance. The random variability sources may also comprise at least one of RDD, LER and gate granularity. Uniform semiconductor device performance data may be obtained by selecting a "golden" measured device, which may be close to the average or median performance Uniform semiconductor device performance data may also be obtained by taking, for example, the average performance data of a cohort of measured semiconductor devices. When obtaining the semiconductor device performance data by measurement, the uniform semiconductor device is a basis around which variations occur.

The TCAD simulation results or measurement results thus obtained are received by the computer on which extraction and parameter generation are performed. In both cases, at least some of the semiconductor device performance data is obtained, at least in part, from a data set acquired by measurement.

At step 304, compact model parameters are extracted from the semiconductor device performance data (TCAD simulation results or physical device measurement results) to produce a plurality ($n_s$*$n_q$) of individual model instances (410 in FIG. 4) each corresponding to the respective statistical instances (406 in FIG. 4) for the plurality of areal trapped charge densities.

At step 304, a set of uniform model parameters relating to the uniform semiconductor device are extracted from the semiconductor device performance data (simulation or measurement results) with no variations. The uniform model parameters are used to re-extract from the semiconductor device performance data a subset ($n_p$) of the uniform model parameters for each of the statistical instances. The subset of model parameters are selected to capture intrinsic statistical variability of semiconductor device performance. The variability arises from intrinsic parameter fluctuations due to configurations of random variability sources that affect semiconductor device performance. The random variability sources may comprise at least one of RDD, LER, poly or metal gate granularity and trapping. The statistical variability of semiconductor device performance arises from the intrinsic parameter fluctuation of time-dependent degradation due to the random variability source of charge trapping in gate dielectric (e.g. oxide) of the semiconductor device.

At step 306, statistics of the extracted compact model parameters are modeled by processing the individual model instances to determine, for each areal trapped charge density: moments describing non-normal marginal distributions of the extracted compact model parameters; and correlations between the extracted compact model parameters. Interpolation may be used to calculate moments and correlations at intermediate values of areal trapped charge density. Generalized Lambda Distribution (GLD) parameters may be calculated to fit the interpolated moments by fitting each determined marginal distribution to a Generalized Lambda Distribution (GLD) using the method of moments. FMKL (Freimer, Mudholkar, Kollia, and Lin, "A study of the generalized Tukey lambda family", Communications in Statistics—Theory and Methods, Volume 17, Issue 10, 1988) parameterization may be used for the fitting.

At step 308, compact model parameters for SPICE model cards are obtained by generating multivariate Gaussian variates and using the determined moments and correlations, for a selected areal trapped charge density. This step may also include applying a Probability Integral Transform to obtain a random sample of variates. The correct moments are attained via the Probability Integral Transform; at the multivariate Gaussian generation stage, the numbers are standard normal.

At step 310, SPICE simulation is performed and finally in step 312, integrated circuits are fabricated with designs based on the SPICE simulation of step 310.

FIG. 4 shows the flow 400 of data from physical TCAD simulations via compact models through to a compact model generator. In this example, at 25 nm gate-length bulk MOSFET 402 is simulated in a TCAD simulator 404 to produce simulation results 406, as described in step 302 of FIG. 3. Extraction software 408 performs the step 304 of FIG. 3 to extract parameters for the model cards 410 from the TCAD simulation results 406. These model cards 410 are input to a compact model generator 412, which performs the steps 306 and 308 of FIG. 3.

Figure 5:
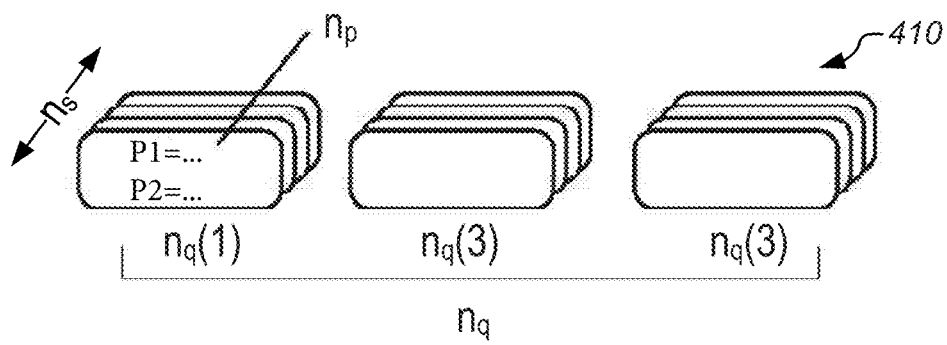
FIG. 5 shows the input data required for the generation process.

FIG. 5 shows the input data 410 required for the generation process performed by compact model generator 412 of FIG. 4 in more detail. At each of the plurality ($n_q=3$) of areal trapped charge densities, $n_q(1)$, $n_q(2)$ and $n_q(3)$, there are $n_s$ model cards, each with $n_p$ parameters (P1, P2, etc.).

Figure 6:
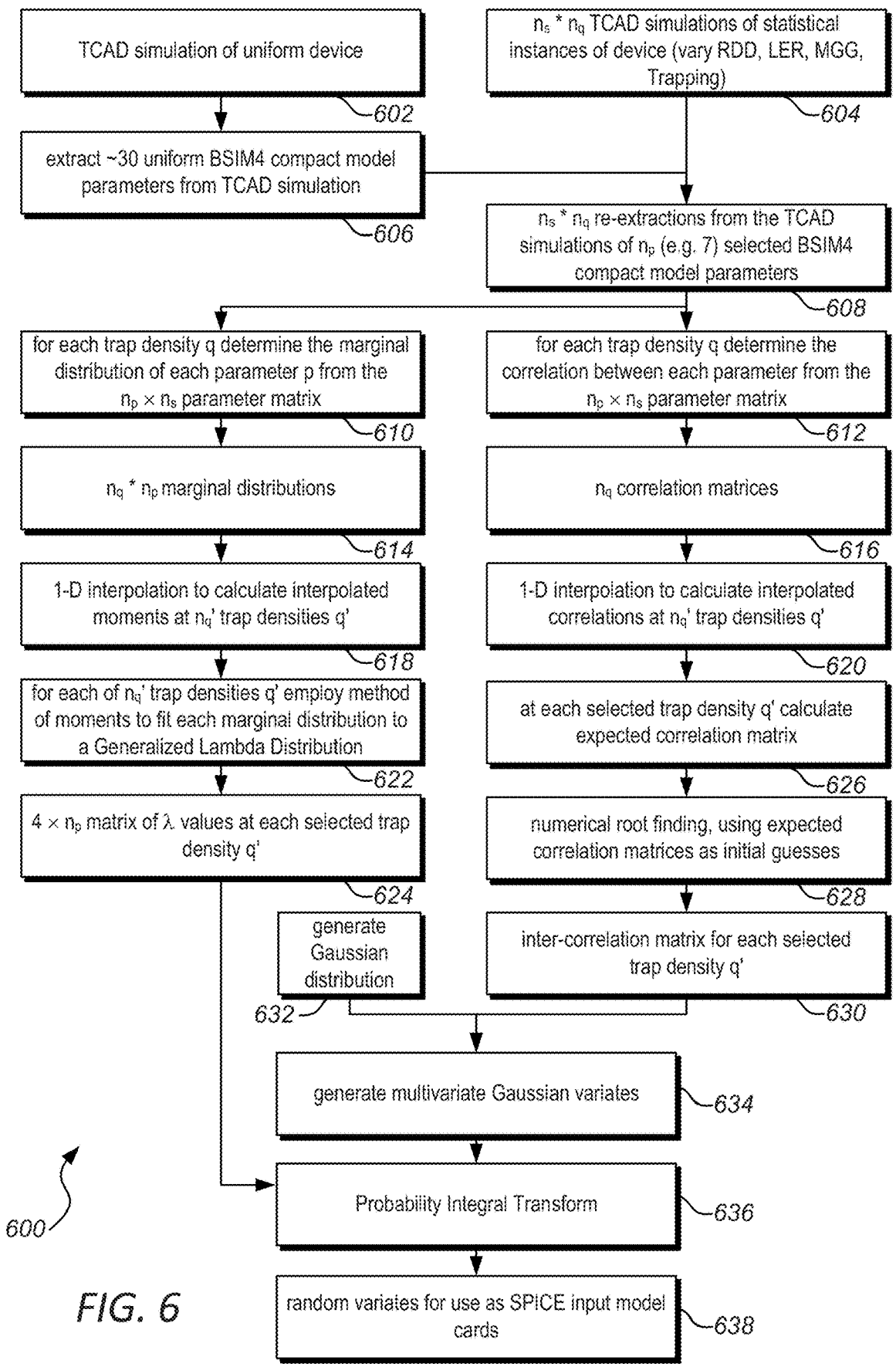
FIG. 6 shows a flowchart illustrating detailed steps taken to implement an embodiment of the present invention.

FIG. 6 shows a flowchart illustrating detailed steps taken to implement an embodiment of the present invention.

At step 602, TCAD simulation of a "uniform" device is performed.

At step 604, TCAD simulations of a plurality ($n_s$) of statistical instances of semiconductor devices are performed for a plurality ($n_q$) of areal trapped charge densities, to produce simulation results. The differences between the statistical instances relate to different modelled configurations of random variability sources, including trapping, which affect semiconductor device performance. The random variability sources may also comprise at least one of RDD, LER and MGG.

A two-stage direct statistical compact model (CM) extraction procedure is applied without making any prior assumptions about parameter distribution, correlation, or sensitivity.

In the first stage 606, a group-extraction and local-optimization strategy for BSIM4 is used to obtain the complete set of BSIM4 parameters for the uniform device. The resulting CM card serves as the base model card for the second-stage statistical extraction 608.

Thus at step 606 a "uniform" compact model is extracted following the process described in "Statistical-Variability Compact-Modeling Strategies for BSIM4 and PSP", Binjie Cheng et al, IEEE Design & Test of Computers 2010, vol. 27, Issue No. 02, March/April, pp: 26-35. This represents the idealized version of the transistor being modeled.

At step 608, a small subset S (e.g. $n_p=7$) of the 'uniform' model parameters are re-extracted in order to model statistical variations in transistor performance. These variations arise from time-dependent degradation due to charge trapping in the transistor oxide and intrinsic parameter fluctuations due to random variability sources such as random discrete dopants RDD, line edge roughness LER and metal gate granularity MGG.

On the basis of the physical analysis of the intrinsic statistical variability impact on device operation, for this example seven statistical parameters were used to capture the intrinsic statistical variability, although other numbers and combinations of suitable parameters may be used. For BSIM4, $V_{TH0}$ is the basic long-channel threshold-voltage parameter, and it accounts for the traditional threshold variation introduced by statistical variability. $U_0$ is the low-field mobility parameter and it accounts for the current-factor variation caused by statistical variability. $N_{factor}$ and $V_{OFF}$ are basic subthreshold parameters, accounting for subthreshold slope and off current variation. $M_{inv}$ is the moderate-inversion parameter, accounting for variation in the moderate inversion regime. $R_{dsw}$ is the basic source/drain resistance parameter, and it accounts for dopant variation in the source/drain. $D_{sub}$ is the drain-induced barrier lowering (DIBL) parameter, and it accounts for statistical variability induced DIBL variation.

The strategy yields an individual model instance corresponding to one microscopic configuration of the transistor, i.e. the particular positions of random dopants, shape of gate edges, grain patterns and trapped charge. The given trapped charge configuration is associated with a particular areal trapped charge density, which in turn corresponds to the cumulative unrecoverable component of transistor ageing due to stress conditions.

By applying the above statistical extraction strategy to each of $n_s$ transistors simulated at each of $n_q$ trapped charge densities, $n_s*n_q$ individual model instances are obtained, each with $n_p$ model parameters. This provides an $n_p \times n_s \times n_q$ 3-D matrix that characterizes the response of the subject transistor to time-dependent degradation.

While the obtained model parameters can be used directly in circuit simulations, the finite sample size $n_s$ limits the resolution of the output variables, particularly in the tails of the statistical distributions, as discussed above with reference to FIG. 2. This is particularly problematic in advanced VLSI technologies as it precisely the rare events that determine the worst case performance and in turn the functional yield.

The present example overcomes this limitation by first modeling the statistics of the extracted model parameters and then using these as inputs to a generation process. The generation process allows new variates to be obtained that are in effect "statistically equal" to the inputs.

The data required for the generation process are obtained as follows with reference to steps 610 to 630.

At step 610, for each fixed trapped charge density q, we can obtain an $n_p \times n_s$ matrix from which we can determine the marginal distribution of each model parameter, and at step

612, the correlation between each model parameter. In general, the marginal distributions need not be normally distributed, and the present example particularly addresses marginal distributions with arbitrary shape. Given the marginal and correlation matrix for a fixed trapped charge density, we then have a complete description of the multivariate density function for the trapped charge density.

The data then comprise $n_q * n_p$ marginal distributions 614 and $n_q$ correlation matrices 616, stored in computer memory. Each marginal distribution is characterized by four statistical moments: the mean, the variance, the skewness and the kurtosis. Given a sufficiently large sample size $n_s$, these statistics are taken as fully sufficient to characterize the distributions of model parameters arising from time-dependent degradation.

The multivariate density function can be determined for each trapped charge density in Q. Such an approach accurately reproduces the input data, however it is limited in that only variates for the initially specified trapped charge densities can be generated. The approach may be generalized to include data that are not part of the input dataset by employing an interpolation scheme for the moments of the marginal distributions. For this example, the marginal distribution moments are assumed to depend linearly on the trap density, however this need not be the case and the present invention applies also to any suitable interpolation scheme that can describe the relationship between the moments and the trap density.

At step 618, 1-D interpolation is used to calculate interpolated moments at $n_q'$ desired trapped charge densities q', some or all of which are interpolated. Similarly, at step 620, 1-D interpolation is used to calculate interpolated correlations at the $n_q'$ trapped charge densities q'. An interpolation scheme is optional but has been shown to reproduce a) the compact model parameter statistics and b) the transistor performance statistics of independently simulated samples at the same trapped charge density. The interpolation scheme is used to obtain interpolated values of the moments.

Each marginal distribution is fitted to the Generalized Lambda Distribution (GLD). In this example, the fitting is performed using FMKL parameterization, which is described in terms of its quantile function and is parameterized by a four element vector λ. It will be appreciated that other methods of fitting may be used as an alternative to FMKL parameterization. The FMKL GLD quantile function is given as:

$$Q(p) = \lambda_1 + \frac{1}{\lambda_2}\left(\frac{p^{\lambda_3} - 1}{\lambda_3} - \frac{(1-p)^{\lambda_4} - 1}{\lambda_4}\right)$$

The distribution function is obtained by numerically inverting the quantile function and the density function via the composition of the distribution function with the quantile density function (the derivative of the quantile function).

At step 622, the method of moments is employed to obtain values for λ that reproduce the target distribution. This is repeated for each of the marginal distributions of the compact model parameters, resulting at step 624 in a $4 \times n_p$ matrix of λ values, being stored in computer memory. This process is repeated for each of the $n_q'$ interpolated trapped charge densities q'.

To generate random variates, Gaussian distributed random numbers are generated and then the Probability Integral Transform is applied to obtain a random sample that follows the expected target distribution. The Probability Integral Transform is defined such that:

$$U = F_X(X)$$

$$Y = F_Y^{-1}(U)$$

where $F_X$ is the distribution function of X, in this case a Gaussian; U is a uniformly distributed random variable; $F_Y^{-1}$ is the quantile function of the target marginal distribution, in this case a GLD fitted to the target data; and Y is a random variable following the target marginal distribution.

But first, in order to complete the description of the multivariate distribution of the compact model parameters, the correlation matrix is used, which is obtained using the following two step process. First, at step 626, the expected correlation matrix is calculated for the target data at each selected trapped charge density q'. Then, due to the fact that the Pearson Product-Moment Correlation is not invariant under the Probability Integral Transform, correlation is determined that, when the Probability Integral Transform is applied to the initial bivariate Gaussian, results in the desired correlation between the two parameters in question. These values are obtained at step 628 using numerical root finding, using the target correlation as an initial guess. Following this, at step 630, a so-called inter-correlation matrix is obtained that represents the "untransformed" relationship between the parameters. There is an inter-correlation matrix for each of the $n_q'$ trapped charge densities q', and this completes the description of the multivariate distribution of the parameters.

To generate parameter instances that follow the specified probability laws, we select the appropriate trapped charge densities q'. At step 632, Gaussian distributed random numbers are generated. Then, at step 634, a multivariate Gaussian variate is generated with the inter-correlation determined by the selected trapped charge density. At step 636, the Probability Integral Transform is applied, with the multivariate Gaussian variates and matrix of l values as inputs, yielding random variates 638 stored in computer memory that are distributed according to the target distribution. The random variates are then used as model cards input to a SPICE simulation. The SPICE simulation is performed and integrated circuits are fabricated with designs based on the SPICE simulation.

The examples described herein provides a compact modeling methodology that fully captures the effects of transistor ageing as obtained from physical 3-D TCAD simulations. The examples allow for highly accurate compact models to be generated that correspond to arbitrary circuit ages, even those that were not part of the input ensemble for the model generation process.

Figure 7:
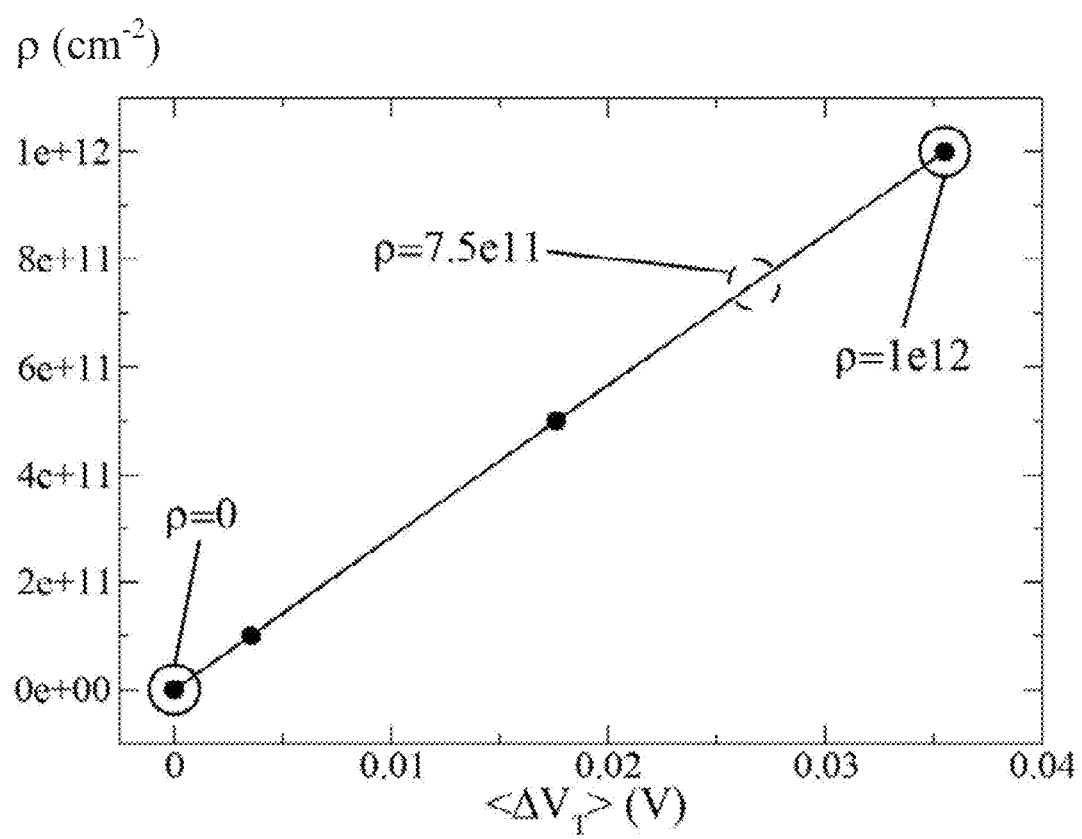
FIG. 7 shows a graph of threshold voltage shift versus trap density, indicating different circuit age points.

FIG. 7 shows a graph of threshold voltage shift $\Delta V_T$ (V) versus trap density p (cm$^{-2}$), indicating the circuit age points that have been used to demonstrate the method described herein. The point $\rho = 7.5e11$ (i.e. $7.5 \times 10^{11}$) corresponds to an intermediate value of trapped charge density q'. The black dots indicate non-intermediate values of trapped charge density q', where physical TCAD simulations are used as inputs to the generation process.

Figure 8:
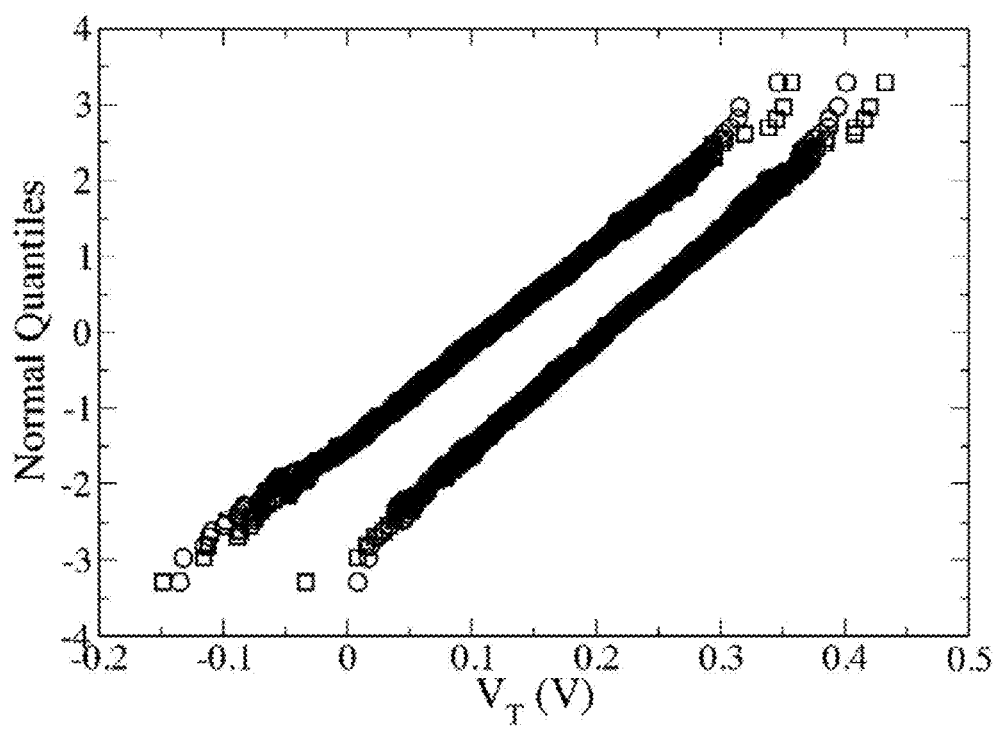
FIG. 8 and FIG. 9 show a graphs with a comparison of threshold voltage at low and high drain bias, as obtained from TCAD simulations and via model generation in accordance with an embodiment of the present invention, for trapped charge densities of zero and $1\times10^{12}$ cm$^{-2}$ respectively.
Figure 9:
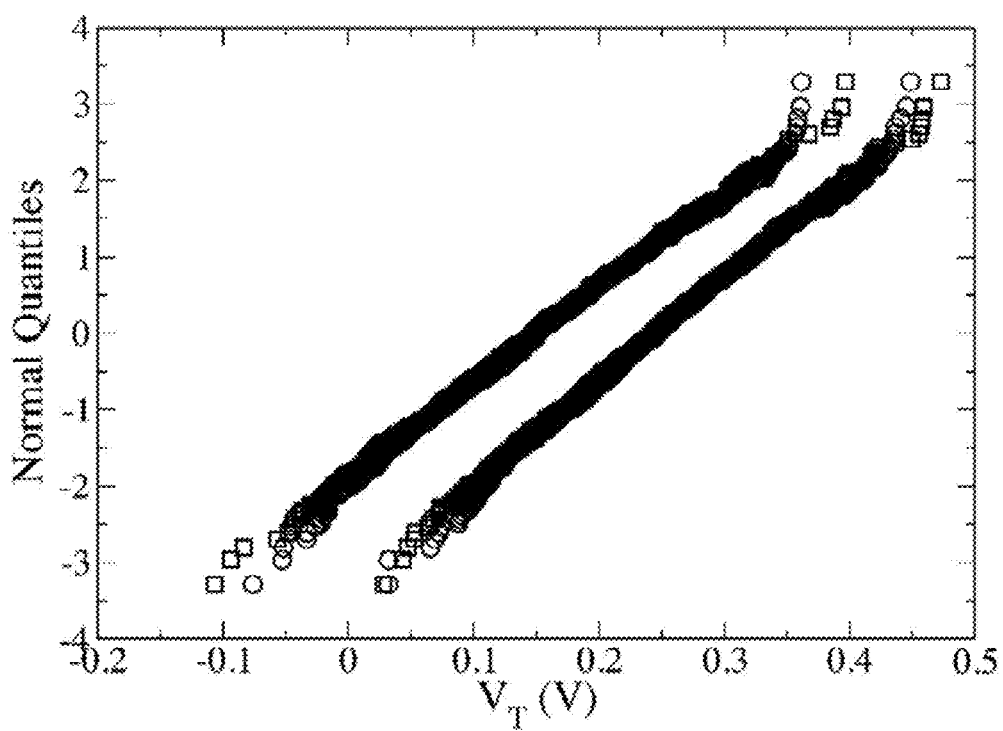

FIG. 8 and FIG. 9 show a graphs with a comparison of threshold voltage $V_T$(V) at low and high drain bias, as obtained from TCAD simulations (squares) and via model generation in accordance with an embodiment of the present invention (circles), for trapped charge density of zero (FIG. 8) and $1 \times 10^{12}$ cm$^{-2}$ (FIG. 9) respectively. The close agreement of between the data obtained from TCAD simulations and that obtained from model generation, even at the extremes of threshold voltage shift, confirms the improved accuracy provided by examples of the present invention.

Figure 10:
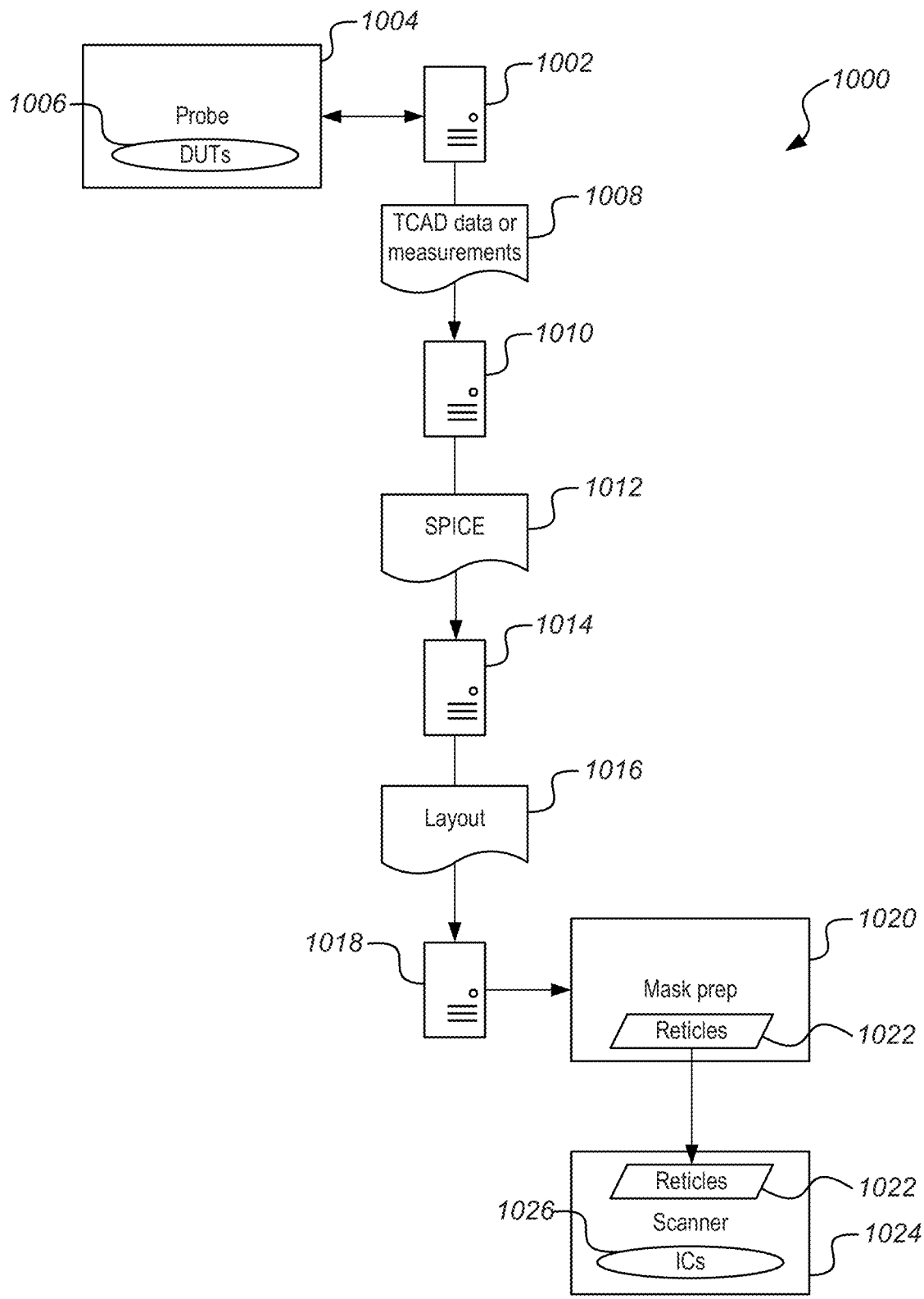
FIG. 10 shows a measurement, simulation and fabrication system for manufacturing integrated circuits in accordance with at least one embodiment of the present invention.

FIG. 10 shows a measurement, simulation and fabrication system for manufacturing integrated circuits in accordance with at least one embodiment of the present invention. The system 1000 has measurement at the left, simulation and design in the middle and fabrication at the right. Computer 1002, which may control probe system 1004, obtains a set of measured data from one or more substrate (typically a semiconductor wafer) under test 1006. The substrate under test 1006 includes physical semiconductor devices under test (DUTs). As described below, the set of measured data is utilized by at least one processor of at least one computer of the system to implement a method for generating semiconductor device model parameters, as described with reference to FIG. 3 to FIG. 6.

The computer 1002 acquires device measurement results and may perform the TCAD simulations, as described with reference to step 302 in FIG. 3 and outputs TCAD simulation results or measurement results 1008. These are received by the computer 1010 on which extraction and parameter generation are performed, as described with steps 304 to 308 with reference to FIG. 3.

The semiconductor device model (SPICE) parameters 1012 thus generated by computer 1010 are received by computer 1014. Computer 1014 uses the generated semiconductor device model parameters in a SPICE simulation as part of the IC design flow. The design process ultimately generates a mask layout 1016.

Another computer 1018 is used to control a mask-preparation tool 1020 using the mask layout 1016 to make a set of reticles 1022. The reticles 1022 are used in a lithography tool, such as a scanner, 1024 to pattern a semiconductor substrate 1026 to produce integrated circuits on the substrate.

Due to the improved accuracy of the invention's method of generating semiconductor device model parameters as described above, the design and/or fabrication of physical semiconductor devices can be significantly improved. In other words, results obtained from the invention's improved generation of semiconductor device model parameters can be utilized to aid engineers in significantly improving the design and/or fabrication of semiconductor circuits and production dies, resulting in an increase in production yield.

It is apparent to one of ordinary skill in the art that the innovative method of the present invention for statistical semiconductor device modeling is, at least in some embodiments, implemented by a computer programmed with code to carry on various steps of the present invention's method as described above. Moreover, the code necessary to program such computer can of course be stored in and/or read from any computer-readable medium, such as a compact disk (CD), a digital video disk (DVD), a flash memory storage device, a hard disk, a random access memory (RAM), or a read only memory (ROM), as well as numerous other computer-readable media not specifically mentioned in this application.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

Thus, a method for generating semiconductor device model parameters has been described.

The invention claimed is:

1. A method for execution in at least one processor of at least one computer, the method for generating semiconductor device model parameters, the method comprising:
   (a) receiving semiconductor device performance data of a plurality ($n_s$) of statistical instances of semiconductor devices, for each areal trapped charge density in a plurality ($n_q$) of areal trapped charge densities, wherein at least some of the semiconductor device performance data is obtained, at least in part, from a data set acquired by measurement;
   (b) extracting $n_p$ model parameters from the semiconductor device performance data to produce a plurality ($n_p * n_s$) of individual model instances each corresponding to the respective statistical instances for the plurality ($n_q$) of areal trapped charge densities, thereby providing $n_p \times n \times n_q$ values that can be represented in a 3-D matrix and that characterizes response of a subject transistor to time-dependent degradation;
   (c) modeling statistics of the extracted model parameters by processing the individual model instances to determine, for each areal trapped charge density:
      moments describing non-normal marginal distributions of the extracted model parameters and
      correlations between the extracted model parameters;
   (d) generating semiconductor device model parameters using the moments determined and the correlations determined, for a selected areal trapped charge density; and
   (e) using the semiconductor device model parameters generated to simulate a circuit to be fabricated with designs based on simulation.

2. The method of claim 1, wherein differences between the statistical instances relate to different modelled configurations of random variability sources, including trapping, which affect semiconductor device performance.

3. The method of claim 2, wherein the random variability sources further comprise at least one of random discrete dopants (RDD), line edge roughness (LER) and gate granularity.

4. The method of claim 1, wherein receiving semiconductor device performance data further comprises:
   obtaining uniform semiconductor device performance data of a uniform semiconductor device that is a basis around which variations occur, and
   wherein extracting model parameters comprises:
   extracting from the uniform semiconductor device performance data a set of uniform model parameters and
   using the uniform model parameters to re-extract from the semiconductor device performance data a subset of the uniform model parameters for each of the statistical instances, and
   wherein the subset model parameters being selected to capture intrinsic statistical variability of semiconductor device performance that arises from intrinsic parameter fluctuation of time-dependent degradation due to charge trapping in a gate dielectric of the semiconductor device.

5. The method of claim 1, wherein modeling statistics comprises using interpolation to calculate moments and correlations at intermediate values of areal trapped charge density.

6. The method claim 1, wherein modeling statistics further comprises calculating Generalized Lambda Distribution (GLD) parameters to fit the moments by fitting each determined marginal distribution to a Generalized Lambda Distribution (GLD) using a method of moments.

7. The method of claim 1, wherein generating model parameters comprises generating multivariate Gaussian variates and applying a Probability Integral Transform to obtain a random sample of variates as the semiconductor device model parameters.

8. The method of claim 1, wherein the model generated corresponds to circuits of arbitrary circuit ages.

9. The method of claim 8, wherein the model generated includes at least one circuit having a circuit age not included in the semiconductor device performance data as received.

10. The method of claim 1, wherein determining, for each areal trapped charge density, moments describing non-normal marginal distributions of the extracted model parameters includes: obtaining for each areal trapped charge density in the plurality ($n_q$) of areal trapped charge densities, an $n_p \times n_s$ matrix of parameters.

11. The method of claim 10, further including determining from the $n_p \times n_s$ matrix of parameters, a marginal distribution of each model parameter.

12. The method of claim 10, further including determining from the $n_p \times n_s$ matrix of parameters, a plurality of $n_q$ correlation matrices.

13. The method of claim 10, further including determining for each areal trapped charge density in a 3D matrix, moments describing a plurality ($n_q * n_p$) marginal distributions and $n_q$ correlation matrices.

14. A system for generating semiconductor device model parameters, the system obtaining a set of measured data from a substrate under test, the substrate under test including a physical semiconductor device, the set of measured data being utilized by at least one processor of at least one computer of the system to implement a method for generating semiconductor device model parameters, the computer configured to perform the steps of:
(a) receiving semiconductor device performance data of a plurality ($n_s$) of statistical instances of semiconductor devices, for each areal trapped charge density in a plurality ($n_q$) of areal trapped charge densities, wherein at least some of the semiconductor device performance data is obtained, at least in part, from the set of measured data;
(b) extracting $n_p$ model parameters from the semiconductor device performance data to produce a plurality ($n_p * n_s$) of individual model instances each corresponding to the respective statistical instances for the plurality ($n_q$) of areal trapped charge densities, thereby providing $n_p \times n_s \times n_q$ values that can be represented in a 3-D matrix and that characterizes response of a subject transistor to time-dependent degradation;
(c) modeling by computer statistics of the extracted model parameters by processing the individual model instances to determine, for each areal trapped charge density:
moments describing non-normal marginal distributions of the extracted model parameters and
correlations between the extracted model parameters;
(d) generating semiconductor device model parameters using the moments determined and the correlations determined, for a selected areal trapped charge density;
(e) using the semiconductor device model parameters generated to simulate a circuit to be fabricated with designs based on simulation.

15. A method of manufacturing integrated circuits, the method comprising:
(a) receiving semiconductor device performance data of a plurality ($n_s$) of statistical instances of semiconductor devices, for each areal trapped charge density in a plurality ($n_q$) of areal trapped charge densities, wherein at least some of the semiconductor device performance data is obtained, at least in part, from a data set acquired by measurement;
(b) extracting $n_p$ model parameters from the semiconductor device performance data to produce a plurality ($n_p * n_s$) of individual model instances each corresponding to the respective statistical instances for the plurality ($n_q$) of areal trapped charge densities, thereby providing $n_p \times n_s \times n_q$ values that can be represented in a 3-D matrix and that characterizes response of a subject transistor to time-dependent degradation;
(c) modeling statistics of the extracted model parameters by processing the individual model instances to determine, for each areal trapped charge density:
moments describing non-normal marginal distributions of the extracted model parameters and
correlations between the extracted model parameters;
(d) generating semiconductor device model parameters using the moments determined and the correlations determined, for a selected areal trapped charge density;
(e) using the generated semiconductor device model parameters to generate a mask layout; and
(f) using the mask layout to pattern a semiconductor substrate to produce an integrated circuit.

16. A non-transitory computer-readable medium containing program code, the program code adapted to configure at least one processor to perform:
(a) receiving semiconductor device performance data of a plurality ($n_s$) of statistical instances of semiconductor devices, for each areal trapped charge density in a plurality ($n_q$) of areal trapped charge densities, wherein at least some of the semiconductor device performance data is obtained, at least in part, from a data set acquired by measurement;
(b) extracting $n_p$ model parameters from the semiconductor device performance data to produce a plurality ($n_p * n_s$) of individual model instances each corresponding to the respective statistical instances for the plurality ($n_q$) of areal trapped charge densities, thereby providing $n_p \times n_s \times n_q$ values that can be represented in a 3-D matrix and that characterizes response of a subject transistor to time-dependent degradation;
(c) modeling statistics of the extracted model parameters by processing the individual model instances to determine, for each areal trapped charge density:
moments describing non-normal marginal distributions of the extracted model parameters and
correlations between the extracted model parameters;
(d) generating semiconductor device model parameters using the moments determined and the correlations determined, for a selected areal trapped charge density; and
(e) using the semiconductor device model parameters generated to simulate a circuit to be fabricated with designs based on simulation.

17. The non-transitory computer-readable medium of claim 16, wherein the computer-readable medium being selected from the group consisting of a compact disk (CD), a digital video disk (DVD), a flash memory storage device, a hard disk, a random access memory (RAM), and a read only memory (ROM).

\* \* \* \* \*